INVENTOR.
WILLIAM H. MC LELLAN
BY
Christie, Parker & Hale
ATTORNEYS

Dec. 6, 1960  W. H. McLELLAN  2,963,649
GALVANOMETER
Filed Aug. 26, 1957  4 Sheets-Sheet 2

INVENTOR.
WILLIAM H. McLELLAN
BY
Christie, Parker & Hale
ATTORNEYS

Dec. 6, 1960

W. H. McLELLAN 2,963,649

GALVANOMETER

Filed Aug. 26, 1957

INVENTOR.
WILLIAM H. McLELLAN

BY

ATTORNEYS.

United States Patent Office 2,963,649
Patented Dec. 6, 1960

2,963,649
GALVANOMETER

William H. McLellan, Pasadena, Calif., assignor, by mesne assignments, to Consolidated Electrodynamics Corporation, Pasadena, Calif., a corporation of California Filed Aug. 26, 1957, Ser. No. 680,301

6 Claims. (Cl. 324—97)

This invention relates to galvanometers and particularly to a galvanometer adapted to measure the product of two electrical signals.

In uses where it is desired to obtain a continuous record of varying electrical signals, galvanometers adapted to respond to a single electrical signal are placed in a recording camera or oscillograph. The responses of the galvanometer are recorded on a photographic film or paper so as to provide a continuous record of instantaneous current passing through the instrument.

In recording oscillographs it is common to use a permanent magnet block. This block serves two important functions. First, it is frequently required in recording oscillographs that a number of galvanometers be used. In order that the responses of all of these galvanometers may be recorded on a single sheet of photographic paper or film, it is necessary to space these galvanometers as close together as practicable. Second, in order to avoid increasing the weight and size of the individual galvanometers, as would be necessary if a permanent magnet were incorporated into each, it is desirable that a means for magnetizing each of two pole pieces extending respectively beyond the opposite sides of the casing of each galvanometer be present within the oscillograph. The permanent magnet block accomplishes both of these purposes. The magnet block may be constructed in a manner such that a number of galvanometers may be compactly arranged side by side with each of the two pole pieces of each galvanometer resting respectively on means attached to each of the two poles of the permanent magnet. The pole pieces of each galvantometer are thereby magnetized. In addition to accomplishing the purposes set forth above, the construction permits a convenient means for inserting and removing individual galvanometers.

The presence of a permanent magnet block in a recording oscillograph or other installation precludes the use of present instruments designed to measure the product of two electrical signals. In instruments of this type now in existence, no effective means is provided by which the effect of the magnetic flux induced by the permanent magnet is nullified. Therefore, measurements of the product of the two electrical signals of interest are affected by the permanent magnetic flux.

There are numerous applications where an electrical product measuring instrument is required. In such applications, it is highly desirable that the instrument be insertable in the permanent magnet block of a recording oscillograph so as to be interchangeable with conventional single signal-measuring instruments. The inability of existing product-measuring instruments to nullify the effect of permanent magnetic flux therefore drastically curtails their use. My invention overcomes this limitation and provides an instrument which can be effectively used to measure the product of electrical signals even in the presence of permanent magnetic flux.

My invention is a galvanometer adapted to measure the product of two electrical signals and comprises a case within which are enclosed two galvanometer coils connected to each other electrically and mechanically and held one above the other in tension between an upper and lower suspension means within the case. Means are provided for supplying an electrical signal to the galvanometer coils. Means are also provided for indicating the torsional deflection of the system. Two pole pieces, spaced apart, project one above the other into the case from each of two opposite sides of the case. The opposed upper pole pieces form an air gap within which one galvanometer coil is suspended, and the opposed lower pole pieces form an air gap within which the other galvanometer coil is located. Wire is wound around each pole piece so as to form a field coil, and means are provided for supplying an electrical signal to the field coils.

The galvanometer of the invention is made so as to be insertable in the permanent magnet block in conventional oscillographs. However, through the use of two suspended coils, the effect of the permanent magnetic flux induced by the poles of the permanent magnet is nullified. This is achieved by passing current through one coil in a direction opposite to that in which the same current flows through the other coil. Since the direction and number of lines of permanent magnetic flux are the same across both coils, the angular deflection induced in one coil is equal but opposite to the angular deflection induced in the other coil. Therefore, the presence of permanent magnetic flux causes no resultant deflection of the suspension system. The nature of this invention and its manner of use will be more clearly understood from the following description taken in conjunction with the accompanying drawings in which:

Figure 1:
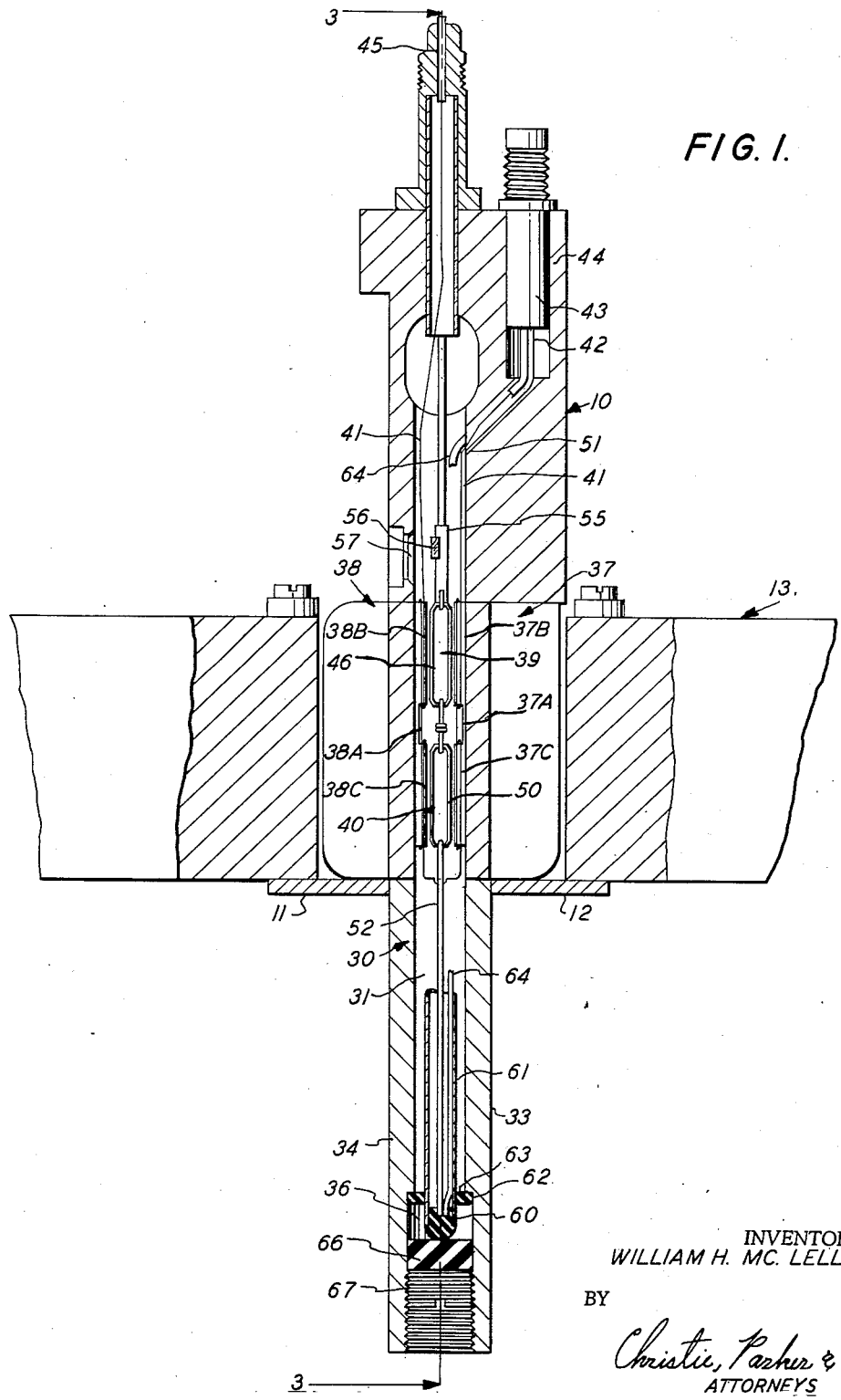
Fig. 1 is a sectional elevation of a galvanometer according to the invention.
Figure 2:
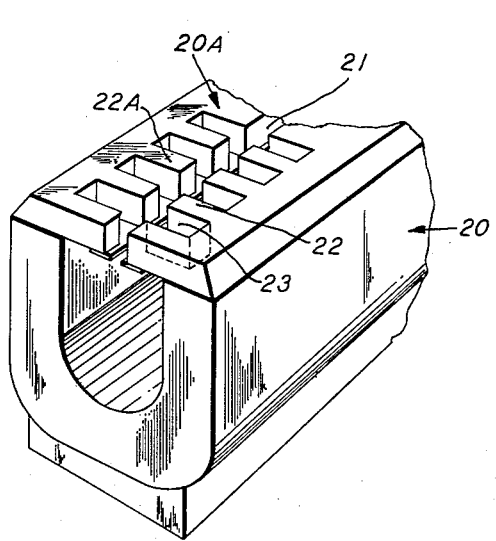
Fig. 2 shows a permanent magnet adapted to receive a number of galvanometers.

With reference to Fig. 1 a galvanometer 10 is shown inserted in a permanent magnet block 13. An arrangement suitable for use as a permanent magnet is shown in Fig. 2. It comprises two magnet poles 20 and 20A separated by an air gap 21. At the air gap, there are formed a number of tongues 22 protruding from one of the magnet poles and a number of similar tongues 22A protruding from the other magnet pole. The two sets of tongues extend toward each other as shown in Fig. 2, and each tongue on one pole has a counterpart oppositely disposed on the other pole of the magnet. Between each adjacent pair of tongues, there is formed a space 23 large enough to accommodate the galvanometer pole pieces. As shown in Fig 1, ledges 11 and 12 attached to respective poles of the magnet provide support for the galvanometer within space 23.

The permanent magnet block does not constitute a part of this invention. It is described here to illustrate the manner in which the galvanometer of this invention may be inserted interchangeably with conventional galvanometers in recording oscillographs. A permanent magnet block of the type described was disclosed in Patent No. 2,599,661 issued June 10, 1952, to Arthur D. Richardson.

Figure 3:
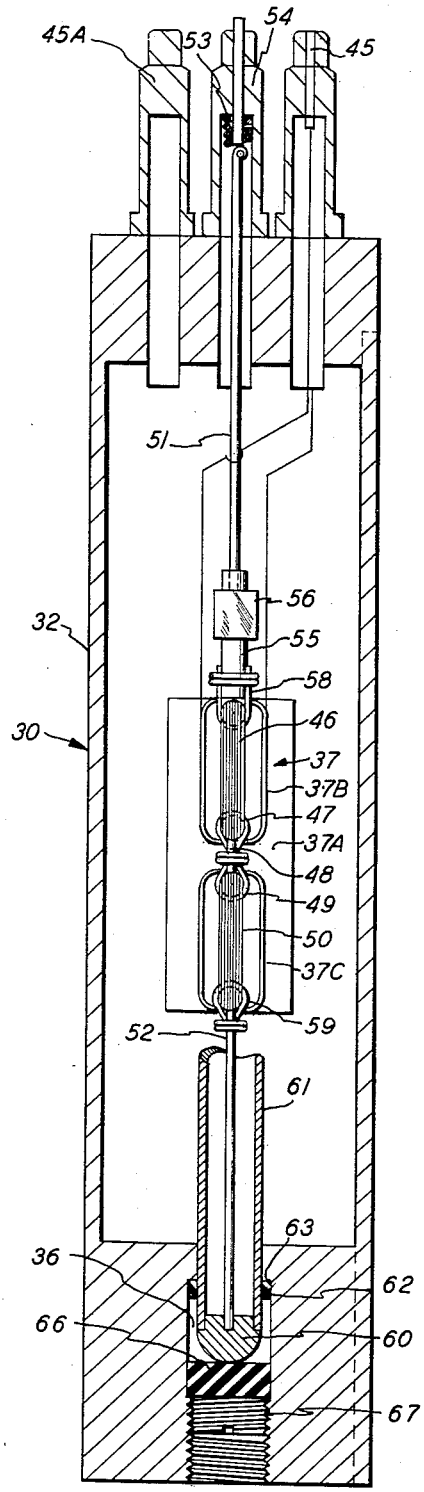
Fig. 3 is a side view taken along line 3—3 of Fig. 1 and modified in propotions to show details of the invention.
Figure 4:
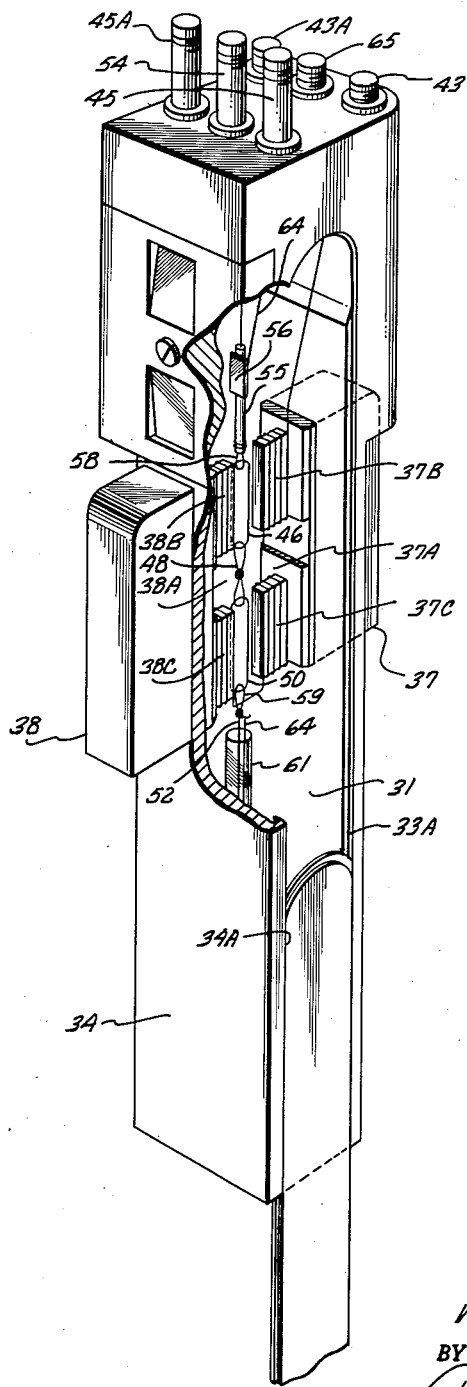
Fig. 4 is an isometric view partially cut away of the galvanometer according to the invention.
Figure 5:
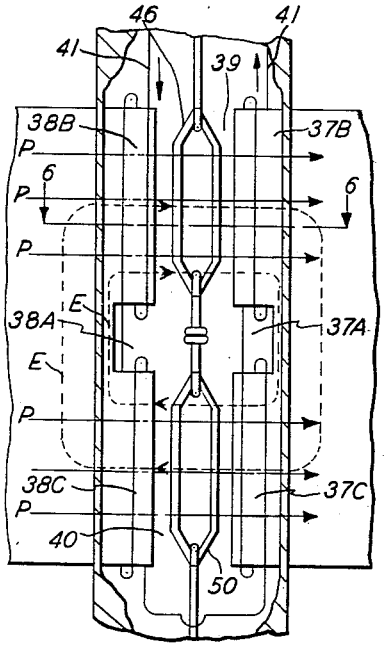
Fig. 5 is an enlarged elevation partially broken away, showing two suspended coils between the pole pieces in greater detail.
Figure 6:
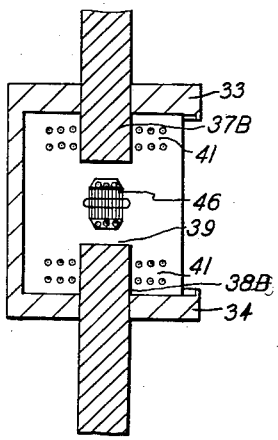
Fig. 6 is an enlarged section of the pole pieces taken along lines 6—6 of Fig. 5.

With reference to Figs. 1, 3 and 4 the galvanometer comprises a case 30 having a length many times greater than its cross sectional area. An elongated groove 31 is provided in the intermediate position of the case to form back side 32 and sides 33 and 34. A cover 35 is adapted to be placed on or removed by sliding it in grooves 33A and 34A formed internally in sides 33 and 34. A longitudinal bore 36 is provided in the lower end of the case so as to extend from the end of the case almost into the groove. A pair of pole pieces 37 and 38 are fastened through the sides 33 and 34 of the case. The pole pieces are made of iron or other suitable magnetic material. In Fig. 5 and Fig. 6 the pole pieces are shown in enlarged detail. Pole piece 37 contains a center slot 37A so that an upper projection 37B and a lower projection 37C are formed within the pole piece. Similarly pole piece 38 contains a center slot 38A so that an upper projection 38B and a lower projection 38C are formed within the pole piece. The upper and lower projections of each pole piece protrude from opposite sides 33 and 34 into the interior of the galvanometer and toward each other. In this manner, an air gap 39 is formed between the opposed upper projections 37B and 38B and an air gap 40 is formed between the opposed lower projections 37C and 38C. The upper and lower projections of each pole piece are smaller in cross-sectional dimension than the portion of the pole piece extending outwardly from the case.

As described above, the upper and lower projections of each pole piece and the portion of the pole piece extending through each side of the case are formed of one piece. While this is a convenient method of construction, alternatively separate pole pieces extending through the case may be used for the upper and lower projections on each side. Another advantageous mode of construction is to join by suitable means each of the four projections to sides 33 and 34 on the inside of the case. Each of the projections is made of magnetic material. To provide support for the galvanometer within magnet block 13, two external pieces are joined to sides 33 and 34. The external pieces are made of a non-magnetic material such as brass. The advantage of this construction is that the non-magnetic external pieces reduce the amount of permanent magnetic flux in the air gaps between the upper and lower pole pieces.

Each projection is wrapped with wire to provide four field coils. A wire 41 is wrapped around upper projection 37B to provide the number of turns necessary to make a suitable field coil. The same wire is then wrapped around lower projection 37C to make a field coil and then successively around lower projection 38C and upper projection 38B. In this manner, all four field coils are electrically connected in series so that the same current flows through each coil. The wire 41 leading to upper projection 37B is soldered at its upper end to an electrical lead 42 which passes through an opening in the side wall 33 and is anchored to a side terminal post 43 positioned in an upper projection 44 made as an integral part of the case. Side terminal post 43 provides the first external contact for the field coils. The other end of wire 41 leading away from upper projection 38B is soldered at its upper end to a terminal post 45 thereby providing the second external contact for the field coils. While the windings around each of the projections have been shown as made by one continuous wire 41, it is apparent that separate windings may be made around each projection so long as means are provided to connect the four field coils electrically in series.

As described above, all four field coils are electrically connected in series. In certain applications, as where the alternating voltage to be measured is low, it is desirable to connect the field coils in parallel. The additional terminals 43A and 45A as shown in Fig. 4 make this possible using the same galvanometer. Although not shown in the drawings, the manner in which the field coils can be connected in parallel is readily apparent. Wire 41 would be wrapped around projections 37B and 37C successively to form two field coils. The ends of wire 41 would be connected to terminal posts 43 and 45. Another wire (not shown) would be wrapped around projections 38B and 38C successively and the ends of this wire would be connected to terminal posts 43A and 45A. The electrical connection of the windings around projections 37B and 37C in parallel with the windings around projections 38B and 38C would then be made externally of the galvanometer.

A coil 46 shaped to occupy a small cross-sectional area is suspended within the air gap 39 formed between the two upper projections 37B and 38B. A stirrup 47 is looped through the lower part of suspended coil 46 and is connected directly to a wire 48. The lower part of wire 48 is connected directly to a stirrup 49 which is looped through the upper part of a second coil 50 suspended within the air gap 40 formed between opposed lower projections 37C and 38C. Each coil is composed of a fine insulated wire wound in such a manner that the coil is substantially cylindrical in form with a circular cross section. For reasons that will become apparent from the description below, the winding in the upper suspended coil 46 is electrically connected to the winding in the lower suspended coil 50 in such a manner that the direction of electrical current flow in the winding of the upper suspended coil is opposite to the direction of current flow in the lower suspended coil.

The coils are suspended within the two air gaps between an upper suspension wire 51 and a lower suspension wire 52. As shown in Fig. 3, the upper end of the upper suspension wire is anchored to a tension spring 53 which in turn is anchored to a terminal post 54 sealed through the upper end of the case. This central terminal post provides one external contact for the galvanometer coil. The lower portion of the upper suspension wire is reenforced by a tubular coaxial stiffener 55 rigidly joined to the wire as by solder. A mirror 56 is mounted in a notch in the tubular stiffener so as to be in alignment with a window 57 in the wall 34. A stirrup 58 attached to the tubular stiffener is looped through the upper end of upper suspended coil 46 so as to rigidly join the upper end of the coil to the stiffener. The lower end of lower suspended coil 50 is secured to the upper end of lower suspension wire 52 by means of a stirrup 59 fastened directly to the lower suspension wire.

In order to control the frequency response of the two coils and the upper and lower suspension means, it is generally desirable to employ a damping arrangement. The necessity for a damping arrangement and the selection of the particular type which is most suitable are determined by the particular application to which the instrument will be placed. A damping tube 61 as part of a fluid-damping arrangement is partially shown in Figs. 1 and 3 and completely shown in Fig. 4. This damping arrangement is included to illustrate the use of a damping arrangement in conjunction with the galvanometer of this invention. The damping arrangement shown is not considered a part of this invention and is fully described in copending application, Serial No. 386,873, filed October 19, 1953 by John R. Tavis.

The lower end of the lower suspension wire is attached to a conductive solid cap 60 cemented inside the opening at the lower end of the damping tube 61. The damping tube is disposed within the galvanometer case so as to be coaxially aligned with the lower suspension wire, the two suspended coils and a portion of the upper suspension. A metal washer 62 having an I.D. slightly larger than the O.D. of the damping tube is cemented to the damping tube near its lower end and seats upwardly against a shoulder 63 formed internally as an integral part of the galvanometer case. The lower end of a connecting wire 64 is soldered to the solid cap within the damping tube, and as particularly shown in Fig. 4, the other end of the wire is carried upwardly out of the upper end of the tube. The wire is cemented inside the full length of the glass tube. The upper end of the wire is connected to a side terminal post 65 in the same manner as was described above for the connection of wire 41 to side terminal post 43. Side terminal post 65 provides the second external contact for the galvanometer coils.

By means of a resilient plug 66 disposed within the longitudinal bore 36 in the bottom of the case and acting from a compression screw 67, the washer 62 is pressed against the shoulder formed internally in the case. In this manner the damping tube is sealed against the galvanometer case.

The operation of the galvanometer of this invention will be more clearly understood by reference to Fig. 5. as above described, Fig. 5 is an enlarged elevation showing upper suspended coil 46 positioned in air gap 39 formed between opposed upper projections 37B and 38B. Lower suspended coil 50 is shown positioned in air gap 40 formed between opposed lower projections 37C and 38C. Wire 41 is wound successively around projections 37B, 37C, 38C and 38B so that each projection with its winding constitutes a field coil.

As shown in Fig. 5, lines of magnetic flux P induced by permanent magnet 13 (not shown in Fig. 5) are in a direction from left to right as represented by the arrows formed by broken lines. As previously described, upper suspended coil 46 is electricaly connected to lower suspended coil 50 in a manner such that the direction of current flow through the winding of upper suspended coil 46 is opposite to the direction of current flow through the winding of lower suspended coil 50. To illustrate the manner in which the use of the two coils nullifies the effect of the magnetic flux induced by the permanent magnet, it can be assumed that the direction of current flow through the winding of upper coil 46 is clockwise while the direction of current flow through the winding of lower coil 50 is counterclockwise. The passage of current in a clockwise direction through suspension coil 46 in the presence of the permanent magnetic flux produces a force which acts to deflect coil 46, the right hand side of the coil moving in a direction outward of the paper. On the other hand, the passage of current in a counterclockwise direction through suspended coil 50 in the presence of the unidirectional permanent magnetic flux produces a force acting to move the right hand side of coil 50 in a direction inward from the plane of the paper. Since the same current flows through both coils 46 and 50 and the same amount of permanent magnetic flux is cut by each coil, the torque produced on coil 46 is equal in magnitude but opposite in direction to the torque produced on coil 50. Consequently, no resultant movement of the suspension occurs as a result of the presence of the permanent magnetic flux. The passage of electrical current in the direction shown by the arrows in Fig. 5 through the field coils comprising wire 41 wound around projections 37B, 37C, 38B and 38C magnetizes each of these projections. As a result, a magnetic flux density is produced which varies with the quantity of current passing through the windings of the four projections. The direction of the lines of electromagnetic flux E are represented by the dotted lines in Fig. 5. It is seen that the lines of electromagnetic flux crossing coil 46 are in a direction opposite to the lines of electromagnetic flux crossing coil 50. However, the same number of lines of electromagnetic flux pass across each suspended coil. Since the flow of current through the winding of suspended coil 46 is opposite to the flow of current through the winding of suspended coil 50, the force produced by the passage of current in coil 46 produces a torque which is in the same direction as the torque produced by the passage of current through coil 50. Therefore, the deflections of the two coils are equal and additive so that the oscillations of the mirror 56 will reflect the product of the current passing through the field coils and the current passing through the suspended coils.

In the manner described above, where it is desired to measure the product of two forces transformable into electrical signals, one such signal is imposed as a current passing through the windings of projections 37B, 37C, 38B, 38C and the other signal is passed as a current through the suspended coils. The resultant angular deflection of the suspension system suitably recorded measures the instantaneous variations of the product of these two currents.

Figure 8:
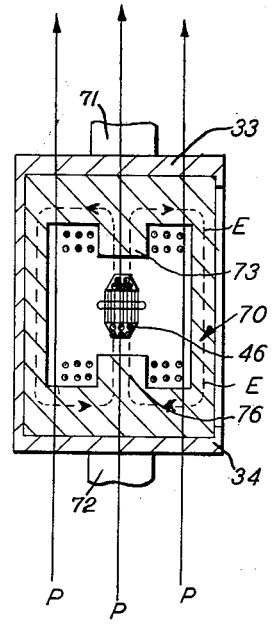
Fig. 8 is a sectional plan view taken along line 8—8 of Fig. 7.
Figure 7:
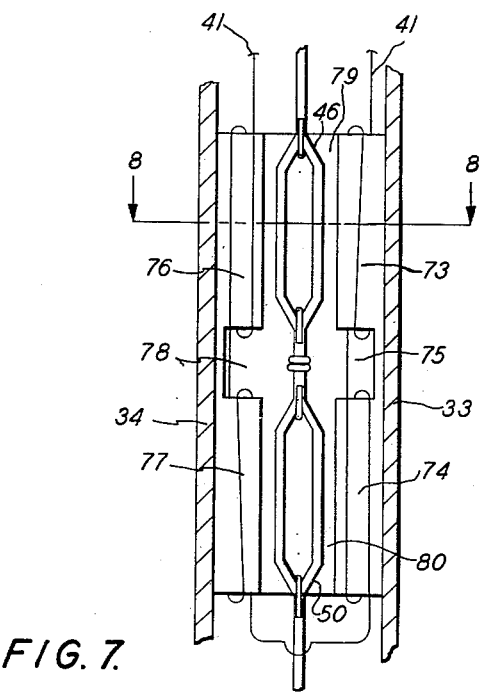
Fig. 7 is an enlarged elevation showing another embodiment of the invention.

In Figs. 7 and 8, another embodiment of this invention is shown in a sectional plan view and a sectional elevation. Like numbers are used for parts identical to those shown in Figs. 1, 3 and 4. An insert 70 made of iron or other magnetic material is suitably joined in a central location to opposite sides 33 and 34 of a galvanometer. The galvanometer is of the same construction as the galvanometer shown in Figs. 1, 3 and 4 with the exception that no pole pieces extend through the sides of the galvanometer. Two external pieces, 71 and 72, preferably made of a non-magnetic material such as brass, are joined to sides 33 and 34 in a central location so as to provide support for the galvanometer within the permanent magnet block. The insert 70 is located in the position shown occupied by the pole pieces in Figs. 1, 3 and 4. The insert is substantially rectangular in shape and is hollowed out in the center, so that an upper projection 73 and a lower projection 74 separated by a slot 75 protrude from one side and an upper projection 76 and a lower projection 77 separated by a slot 78 protrude from the opposite side. The insert is placed so that the projections formed within it are normal to the sides 33 and 34 of the galvanometer.

In the same manner as previously described with reference to Fig. 1, a wire 41 is connected at its ends to terminal posts to provide two external contacts. The wire is successively wound around projections 73, 74, 77 and 76 to form four field coils electrically connected in series. Alternateively, the windings around projections 73 and 74 may be connected in parallel with the windings around projections 76 and 77 as previously described. An upper coil 46 is suspended in an air gap 79 formed between upper projections 73 and 76 of the insert and a lower coil 50 is suspended in an air gap 80 formed between lower projection 74 and lower projection 77. The means by which the two coils are suspended are the same as previously described. In addition the windings of the coils are electrically connected so that the direction of current flow in the winding of the upper coil is opposite to the direction of current flow in the winding of the lower coil. In this manner and as previously described in conjunction with Fig. 5, the effect of lines of permanent magnetic flux, as represented by the arrows formed by broken lines in Fig. 8, is nullified.

The flow of current through wire 41 magnetizes projections 73, 74, 76 and 77 and produces lines of electromagnetic flux. The flux density so produced is proportional to the amount of current flowing through the field coils. As described in connection with Fig. 5, the deflections of the suspended coils are equal and additive. The angular deflection of the mirror in the suspension system is therefore proportional to the product of one current flowing through the field coils and the other current flowing through the suspended coils.

The advantage of the insert used in the embodiment shown in Figs. 7 and 8 is that the insert of magnetic material provides a path of low reluctance. Because of this low reluctance path, a greater number of lines of magnetic flux produced by the field coils cross the air gaps in which the suspended coils are located. Therefore, a more sensitive response to current flow through the field coils is obtained. This is of particular importance when low values of current flow in the field coils.

Figure 9:
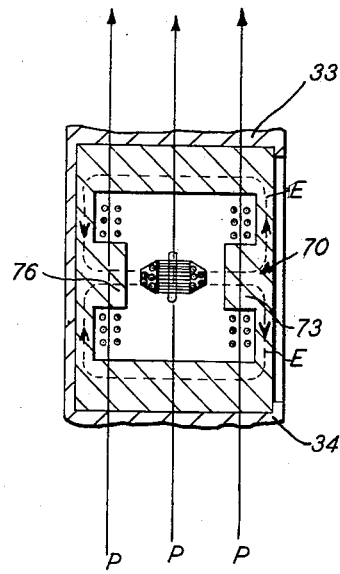
Fig. 9 is a sectional plan view of yet another embodiment of the invention.

In Fig. 9, yet another embodiment of this invention is shown. Like numbers are used for parts identical to those shown in Figs. 7 and 8. The insert 70 previously described is joined to opposite sides 33 and 34 of the galvanometer so that projections 73, 74, 76 and 77 lie parallel to the sides of the galvanometer. The two suspended coils 46 and 50 are rotated 90° from the position shown in Fig. 7 and are suspended so that the upper coil is suspended within the air gap formed between the pair of opposed upper projections and the lower coil is suspended within the air gap formed between the pair of opposed lower projections. In this position, each coil is normal to the lines of permanent magnetic flux P so that each coil cuts a minimum number of such lines. In nullifying the effect of the lines of permanent magnetic flux as described previously, some small residual effect may exist because of slight variations in the suspension system. Placing the suspended coils in the manner shown in this embodiment reduces this slight residual effect.

It is apparent that the galvanometer of this invention may be advantageously utilized in many applications. In addition to the embodiments previously described, and without departing from the basic concept of the invention, the two suspended coils and all four field coils may be connected in series electrically so that the same current flows through all coils. In this manner, the product obtained would be the square of the current flowing through the instrument. In another embodiment, each of the four field coils may be connected to a separate electrical signal so that the product obtained could be utilized to determine the sum of the four currents flowing in the field coils.

The versatility of this galvanometer and its adaptation for use in existing oscillographs make this instrument suitable for a wide number of uses.

I claim:

1. In combination with a magnet comprising a pair of poles between which a galvanometer can be accommodated, a galvanometer comprising a case, two suspended coils connected to each other electrically and mechanically and held one above the other between an upper and lower suspension means held in tension within the case, the suspended coils being electrically connected whereby the flow of current through the winding of one coil is in a direction opposite to the flow of current through the winding of the other coil, means for supplying an electrical signal to the two suspended coils, means for indicating the torsional deflection of the suspension means, opposed galvanometer pole pieces between the magnet poles and projecting into the case from opposite sides thereof to provide pairs of upper and lower pole pieces, the pair of upper pole pieces forming an air gap within which one suspended coil is positioned and the pair of lower pole pieces forming an air gap within which the other suspended coil is positioned, a wire wound around each pole piece to form a field coil winding, and means for supplying an electrical signal to the field coil windings, the direction of the field coil windings and electrical current flow therethrough arranged whereby the electromagnetic flux across one air gap is opposite in direction to the electromagnetic flux across the other air gap.

2. Apparatus in accordance with claim 1 wherein the field coil windings are electrically connected in series.

3. Apparatus in accordance with claim 1 wherein the field coil windings on one side of the case are electrically connected in parallel with the field coil windings on the other side of the case.

4. In combination with a magnet comprising a pair of magnet poles provided with oppositely located slots within which a galvanometer can be accommodated, a galvanometer comprising a case, two suspended coils connected to each other electrically and mechanically and held one above the other between an upper and lower suspension means held in tension within the case, the suspended coils being electrically connected whereby the flow of current through the winding of one coil is in a direction opposite to the flow of current through the winding of the other coil, means for supplying an electrical signal to the two suspended coils, means for indicating the torsional deflection of the suspension means, means extending outwardly from opposite sides of the case and engaging a pair of oppositely located slots of the magnet, an insert of magnetic material centrally joined to the case, said insert having a hollow into which two pole pieces project one above the other from opposite sides of the insert, and oriented so that the pole pieces are normal to the lines of magnetic flux between the magnet poles, the opposed upper and lower pairs of pole pieces forming first and second air gaps within which the suspended coils are respectively positioned so as to cut a minimum number of said lines of magnetic flux, a wire wound around each pole piece to form a field coil winding, and means supplying an electrical signal to the field coil windings, the direction of the field coil windings and electrical current flow therethrough arranged whereby the electromagnetic flux across one air gap is opposite in direction to the electromagnetic flux across the other air gap.

5. In combination with a magnet comprising a pair of magnet poles provided with oppositely located slots within which a galvanometer can be accommodated, a galvanometer comprising a case, two suspended coils connected to each other electrically and mechanically and held one above the other between an upper and lower suspension means held in tension within the case, the two suspended coils being electrically connected in a manner such that the flow of electrical current through the winding of one coil is in a direction opposite to the flow of electrical current through the winding of the other coil, means for supplying an electrical signal to the two suspended coils, means for indicating the torsional deflection of the system, a pair of pole pieces extending through opposite sides of the case, the portions of the pole pieces extending outwardly from opposite sides of the case engaging snugly in a pair of oppositely located slots of the magnet, the portion of each pole piece within the case having a central slot to form upper and lower projections, the opposed upper projections leaving an air gap within which one suspended coil is positioned and the opposed lower projections leaving an air gap within which the other suspended coil is positioned, a wire wound around each projection to form a field coil winding, and means for supplying an electrical signal to the field coil windings, the direction of the field coil windings and electrical current flow therethrough arranged whereby the electromagnetic flux across one air gap is opposite in direction to the electromagnetic flux across the other air gap.

6. In combination with a magnet comprising a pair of magnet poles provided with oppositely located slots within which a galvanometer can be accommodated, a galvanometer comprising a case, two suspended coils connected to each other electrically and mechanically and held one above the other between an upper and lower suspension means held in tension within the case, the two suspended coils being electrically connected in a manner such that the flow of electrical current through the winding of one coil is in a direction opposite to the flow of electrical current through the winding of the other coil, means for supplying an electrical signal to the two suspended coils, means for indicating the torsional deflection of the system, means extending outwardly from opposite sides of the case engaging snugly in a pair of oppositely located slots of the magnet, an insert of magnetic material joined to opposite sides of the galvanometer in a central location within the case, the insert having a hollow into which two pole pieces project one above the other from each of two opposite sides of the insert, the opposed upper pair of pole pieces forming an air gap within which one suspended coil is positioned and the opposed lower pair of pole pieces forming an air gap within which the other suspended coil is positioned, a wire wound around each pole piece to form a field coil winding, and means for supplying an electrical signal to the field coil windings, the direction of the field coil windings and electrical current flow therethrough arranged whereby the electromagnetic flux across one air gap is opposite in direction to the electromagnetic flux across the other air gap.

References Cited in the file of this patent

UNITED STATES PATENTS

| | | |
|---|---|---|
| 490,760 | Weston | Jan. 31, 1893 |
| 1,646,634 | Sutherland | Oct. 25, 1927 |
| 2,352,242 | Apstein | June 27, 1944 |
| 2,410,379 | Hathaway | Oct. 29, 1946 |
| 2,599,661 | Richardson | June 10, 1952 |